US011287229B1

(12) United States Patent
Panchal et al.

(10) Patent No.: US 11,287,229 B1
(45) Date of Patent: Mar. 29, 2022

(54) PROCESS FOR PREPARING FOAM CELLULOID PARTS

(71) Applicant: U.S. Government as Represented by the Secretary of the Army, Dover, NJ (US)

(72) Inventors: Viral Panchal, Parlin, NJ (US); Chong Peng, Mason, OH (US); Dale Conti, Andover, NJ (US); Ming-Wan Young, Basking Ridge, NJ (US); Tianyi Huang, Tenafly, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 72 days.

(21) Appl. No.: 16/775,307

(22) Filed: Jan. 29, 2020

Related U.S. Application Data

(63) Continuation-in-part of application No. 15/465,945, filed on Mar. 22, 2017, now Pat. No. 10,711,070.

(60) Provisional application No. 62/815,479, filed on Mar. 8, 2019.

(51) Int. Cl.
| | |
|---|---|
| *B29C 44/12* | (2006.01) |
| *F42B 5/188* | (2006.01) |
| *C08J 9/12* | (2006.01) |
| *F42B 5/192* | (2006.01) |
| *B29C 44/34* | (2006.01) |
| *B29L 31/00* | (2006.01) |
| *B29K 1/00* | (2006.01) |

(52) U.S. Cl.
CPC .......... *F42B 5/188* (2013.01); *B29C 44/1266* (2013.01); *B29C 44/3461* (2013.01); *C08J 9/122* (2013.01); *F42B 5/192* (2013.01); *B29K 2001/18* (2013.01); *B29L 2031/7772* (2013.01); *C08J 2203/06* (2013.01); *C08J 2301/08* (2013.01)

(58) Field of Classification Search
None
See application file for complete search history.

(56) References Cited

U.S. PATENT DOCUMENTS

| 3,474,702 A | 10/1969 | Remaly | |
|---|---|---|---|
| 6,391,233 B1 * | 5/2002 | Otani | B29C 67/202 264/344 |
| 8,597,444 B1 * | 12/2013 | Young | C06B 25/20 149/19.8 |

(Continued)

*Primary Examiner* — Edmund H Lee
(74) *Attorney, Agent, or Firm* — John P. DiScala (57) ABSTRACT

The present invention is directed to a process for making combustible foam celluloid munition parts having high aspect ratios, different densities or having an insert embedded into the foam celluloid munition part. The process for making such foam celluloid munition part requires pre-soaking dry particles of celluloid, placing the celluloid particles into a munition part mold, exposing the celluloid particles to high heat and pressure until the celluloid particles expand and fuse into the shape of the mold. Varying the density or the size of the celluloid particles used in the process produces munition parts having different densities. In addition, the placement of inserts into the particles prior to exposure to high heat and pressure produces munition parts having inserts that are useful for identification and tracking of such parts.

16 Claims, 4 Drawing Sheets

(56) References Cited

U.S. PATENT DOCUMENTS

| | | | |
|---|---|---|---|
| 8,617,328 B1 * | 12/2013 | Young | C06B 23/002 |
| | | | 149/19.8 |
| 8,696,838 B1 * | 4/2014 | Faridi | C06B 25/20 |
| | | | 149/109.6 |
| 11,041,701 B1 * | 6/2021 | Moy | F42B 5/18 |
| 2011/0240904 A1 * | 10/2011 | Chiou | C08K 7/22 |
| | | | 252/62 |

* cited by examiner

~50" long; straight wall

PROCESS FOR PREPARING FOAM CELLULOID PARTS

RELATED APPLICATIONS

This application claims the benefit of provisional application No. 62/815,479, filed Mar. 8, 2019 which claims the benefit of continuation-in-part application Ser. No. 15/140,806, filed. Apr. 28, 2016, now abandoned, which is a continuation-in-part of application Ser. No. 15/095,496, filed Apr. 11, 2016, now abandoned, and claims the benefit of provisional application No. 62/186,526, filed Jun. 30, 2015. This application is also a continuation-in-part of pending application Ser. No. 15/465,945 filed Mar. 2, 2017 now U.S. Pat. No. 10,711,070. The contents of the above-referenced applications are hereby incorporated by reference in their entirety.

RIGHTS OF THE GOVERNMENT

The inventions described herein may be manufactured and used by or for the United States Government for government purposes without payment of any royalties.

FIELD OF INVENTION

The present invention relates generally to the process for preparing foam celluloid parts and more specifically to preparing combustible cartridge cases for military munitions where different sections of the casing may have different densities or have embedded sensors in the foam celluloid casing.

BACKGROUND OF THE INVENTION

Current combustible cartridges for military munitions are made using felted fiber or pulp molding techniques which creates multiple pieces that are joined together to form seams. U.S. Pat. No. 3,474,702 describes a process for making felted fiber combustible cartridge cases. One drawback for applying this process is that the walls to the cartridge cases are slightly tapered to facilitate removal of the part during the de-molding process. The felted fiber molding technique also places an upper limit on the length to diameter ratio, which places an upper limit on the size and therefore the types of applications that can use the felted fiber technology. Typically, the aspect ratio of cartridges manufactured using this technique is generally less than 6 (Length/Diameter) before the integrity of the casing is affected. Current tank combustible felted fiber cartridge cases are generally manufactured to roughly 21 inches in length with a seam joint.

Because of these noted limitations using felted fiber processing methods, it is desirable to develop an improved method for making combustible cartridge casing to overcome some of these limitations.

SUMMARY OF THE INVENTION

It is an object of the invention to provide methods for making combustible foam celluloid munition parts.

In one aspect of the invention, the combustible foam celluloid munition part has varying density where one section has a greater density than another section of the cylinder. The overall shape of the munition part may have zero degree tapering. The method for making the combustible foam celluloid munition part utilizes physical blowing agents to pre-soak dry solid celluloid particles. The pre-soaked dry celluloid particles are then transferred to a munition part mold where at least two different sized celluloid particles or celluloid particles having two different densities are placed into the munition part mold. The celluloid particles are then exposed to high temperatures until the particles expand and fuse together and take on the interior configuration of the mold cavity.

In another aspect of the invention, the combustible foam celluloid munition part has an insert embedded into the part. The method for making the combustible foam celluloid munition part having an insert embedded into the part utilizes physical blowing agents to pre-soak dry solid celluloid particles. The pre-soaked dry celluloid particles are then transferred to a munition part mold where the insert is placed into the mold along with the pre-soaked celluloid particles. The celluloid particles are then exposed to high temperature until the particles expand and fuse together and take on the interior configuration of the mold cavity.

BRIEF DESCRIPTION OF THE DRAWINGS

Further features and advantages of the present invention may be understood from the drawings.

DETAILED DESCRIPTION

Disclosed herein are processes for making combustible foam celluloid parts that are useful replacements for felted fiber parts found in military munitions such as propulsion charges for large tank and artillery. The present process ay also be used to produce combustible replacements parts for non-combustible military munitions (e.g. cartridge casing).

The munition part comprising foam celluloid is composed of about 50% to about 85% nitrocellulose, having a nitrogen content of about 10.0% to about 13.6% and about 15% to about 50% camphor. Such parts have unique advantages over current state of the art felted fiber technology in having a density that is less than about 1.25 gm/cm$^3$ and more specifically about 1.25 gm/cm$^3$ to about 0.5 gm/cm$^3$. Due to the low density and highly flammable nature of foamed celluloid, the parts prepared by this process allow for faster burning while leaving behind minimal residue. In addition, the foamed celluloid part has a lower mass compared to those prepared using felted fiber which reduces the weight that solders must carry in the field. Further, the flexible foamed structure enhances the ability of the foamed product to withstand impact and reduces brittleness especially at lower temperatures.

Preparation of Celluloid Particles

Celluloid particles, a precursor material to preparing foam celluloid combustible munition parts can be prepared in accordance with the process described in U.S. application Ser. No. 15/465,945, U.S. Pat. Nos. 8,597,444 and 8,696,838, the contents of which are hereby incorporated herein in its entirety. Specifically, nitrocellulose, camphor, chemical blowing agent (CBA), stabilizer, and about 30% by weight of a solvent, such as 50%/50% mixture of ethanol and acetone were added to a mixture. The mixture is agitated for about 20-60 minutes at 120° C. F, until the mixture is homogenous. The mixture is then blocked (or consolidated). A standard hydraulic press may be used to accomplish this step. The pressed mixture is then extruded through a die to form spaghetti-like strands. The strands can then be cut using standalone cutter or die face cutting techniques to produce particles such as pellet or bead shapes. The particles are then completely dried at ambient conditions to remove residual solvent and water. The particles can also be stored in a conditioning chamber at elevated temperature to dry them quicker. The particles may further be sorted to ensure size uniformity. The size and shape of particles may vary from application to application to accommodate particle handling and flow properties during transfer and molding. One exemplary celluloid particle size may be about 0.8 mm with a length and diameter ratio of about 1:1.

Preparation of High Density Foam Celluloid Munition Cartridge Cases

Pre-soaking celluloid particles. The dry solid celluloid particles are pre-soaked by placing them into a reaction pressure vessel in the presence of a physical blowing agent (PBA). It is recommended that the PBA be an inert gas such as nitrogen, carbon dioxide or argon. As an example, carbon dioxide may be used as the PBA, The celluloid particles can be treated in the reaction pressure vessel at pressures of about 40 psi to about 10,000 psi, preferably about 200 psi to about 2,000 psi and most preferably about 400 psi to about 800 psi for a period of about 40 minutes to 72 hours, and preferably about 15 minutes to about 24 hours.

Molding of celluloid particles. The pre-soaked celluloid particles are then transferred into a molding apparatus. Such molding apparatus may include those having a collapsible core. The collapsible mold can be assembled manually, join split (or individual) parts together or automatic transfer using hydraulic systems for assembly and de-assembly. The mold is heated from about 200° F. to about 300° F., preferably from about 240° F. to about 255° F. Any method used to heat the mold without affecting the integrity of the molding apparatus may be implemented. Exemplary heating methods include hot water, steam, hot air, or hot oil. Steam heat is preferred (either direct or indirect steam). If using steam heat, exemplary pressures of about 20 psi to less than 70 psi for 1 minute to 15 minutes may be used.

The temperature of the mold may be held until the celluloid particles "foam" meaning that the particles expand and fuse together such that the particles form a unified whole and do not come freely apart. Exemplary holding parameters to foam the particles include 245° F. to 255° F. for about 30 seconds to about 8 minutes. After foaming takes place the mold may be cooled using any method that does not interfere with the integrity of the prepared part or the molding apparatus. Exemplary methods include water, air, and oil. The molded piece that is removed from the molding apparatus should have a density of about 0.7 g/cc to about 1.0 g/cc.

The mold can be designed for any particular part such as munition cartridge casing for tank or artillery.

Preparation of Low Density Foam Celluloid Munition Cartridge Cases

The dry celluloid particles are pre-soaked in accordance with the steps previously described.

Pre-expansion of celluloid particles. The pre-soaked particles may be further pre-expanded to reduce the density prior to the molding step. The pre-expansion step includes heat treatment of the particles for a period of less than 5 minutes with any heating media that does not interfere with the integrity of molding apparatus and achieves lower density free flowing foamed celluloid particles. Exemplary heating media include as hot water, steam, hot air, or hot oil. The heat maybe either injected directly into the vessel holding the particles, brought in direct contact with the particles or indirectly contacted with the particles using a heating jacket. The heating temperature should be sufficient to reduce the density of the celluloid particles to a density of about 0.9-1.2 g/cc. Such heating apparatus and time should not be sufficiently high for the particles to change into a "foam" state wherein the particles become fused together. The purpose here is to partially expand the celluloid particles in order to reduce the density of the celluloid. Therefore the celluloid particles should be loaded into the pre-expansion apparatus with sufficient volume available to allow the particles to freely expand, but not fuse together. Recommended temperature for pre-heating the celluloid particles are from about 80° C. to 110° C., preferably from about 90° C. to 100° C.

The pre-expanded particles may then be pre-soaked and transferred to a molding apparatus for foaming in accordance with the molding procedures previously disclosed for further expansion until the particles fuse together. After the prepared part is cooled, the finished product should have a density of about 0.3 g/cc to about 1.0 g/cc, and preferably from about 0.3 g/cc to about 0.7 g/cc.

It is contemplated that different munition products can be made using the process disclosed herein where the density of the material may vary. Having a higher or lower density, product may be a trade-off between mechanical strength and burn efficiency of the celluloid product. Higher density parts are stronger, but take longer to consume or burn thoroughly. In contrast, low density parts will consume quickly, but may not be strong enough to survive transportation, loading into the gun, and other user handling requirements. Thus, the density of the munition product (e.g. cartridge casing) may be designed to increase the density in areas that require strength or decrease the density in areas requiring less strength, but burn quickly after ignition. The examples below are some exemplary designs of celluloid cartridge cases having different densities.

Example 1. Preparation of Multi-Layered Celluloid Bar that Varies in Density

A vertical tensile bar mold was set up on a hydraulic press machine and connected to a heating unit (for this example, steam media was used). Three different sizes of dry expandable celluloid beads (ECB) having the same density were pre-soaked in a pressurized container with about 500 psi of $CO_2$ (physical blowing agent) for 3.5 hours. The size of the solid celluloid beads are provided in the Table 1 below.

TABLE 1

| Expandable Celluloid Bead Group | Diameter | Thickness |
| --- | --- | --- |
| ECB-1 | 0.77 mm to 0.83 mm | 0.37 mm to 0.43 mm |
| ECB-2 | 0.77 mm to 0.83 mm | 0.57 mm to 0.63 mm |
| ECB-3 | 0.77 mm to 0.83 mm | 0.77 mm to 0.83 mm |

Figure 1:
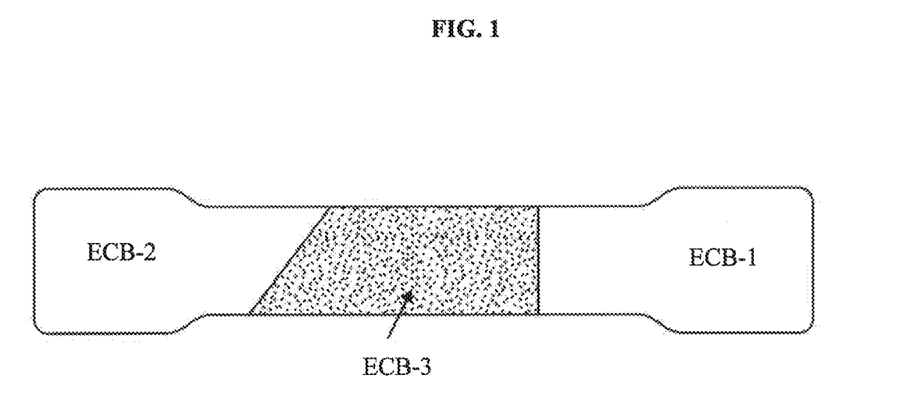
FIG. 1. Is a photograph of an ASTM (American Standard Testing Methods) tensile bar having different densities.

After 3.5 hours, the physical blowing agent was released and the beads were transferred into the vertical tensile bar mold in the following order ECB-1, ECB-3 and ECB-2 being careful not to intermix the three ECB size beads. The mold was closed and approximately 5000 lbs of force on the hydraulic press machine was applied. The steam valve was opened to heat up the mold with about 23 psi of steam pressure (or reach about 250° F.) for roughly 70 seconds. Afterwards the steam valve is closed and cooling water/air lines is applied to the mold to cool it to room temperature (about 4-5 minutes). The sample was removed. FIG. 1 is a photograph of the tensile bar prepared by the process disclosed herein where a first section of tensile bar is comprised of ECB-1 beads, the second section is comprised of ECB-3 beads and the last section is comprised of ECB-2 beads.

Example 2. Preparation of a Multi-Layered Foamed Celluloid Cartridge Munition Case Having Varying Density Foam Celluloid Beads A core-shell mold creating a tubular cavity can be set up on a hydraulic press machine, and connected to a thermal management unit (for this example, steam or super-heated water media can be used). A minimum of at least two different density of dry celluloid beads can be independently pre-weighed and pre-soaked in a pressurized container at about 600 psi of $CO_2$ (physical blowing agent) for 2 hours. Batch #1 are solid celluloid pellets having density of about 1.4 g/cc, and batch #2 are pre-expanded celluloid with a density ranging from 0.9-1.2 glee.

Across the length of the tubular cavity, batch #1 beads can be pneumatically transferred to ¼ portion or section of mold. Following the cavity length, ½ portion or section of the mold can be filled with batch #2 beads and finally the remaining ¼ portion or section of the mold can be filled with batch #1 beads in a similar manner.

The mold can be closed on the hydraulic press machine. The steam valve can be opened to heat up the mold with about 23 psi of steam pressure. Once the temperature stabilizes, the mold may be held for about 90 seconds. The molding cycle can be completed by cooling the mold by water and air to a predetermined temperature. In this experiment, it may be room temperature. The molded product of different density across the casing may be removed from the mold cavity.

Figure 2:
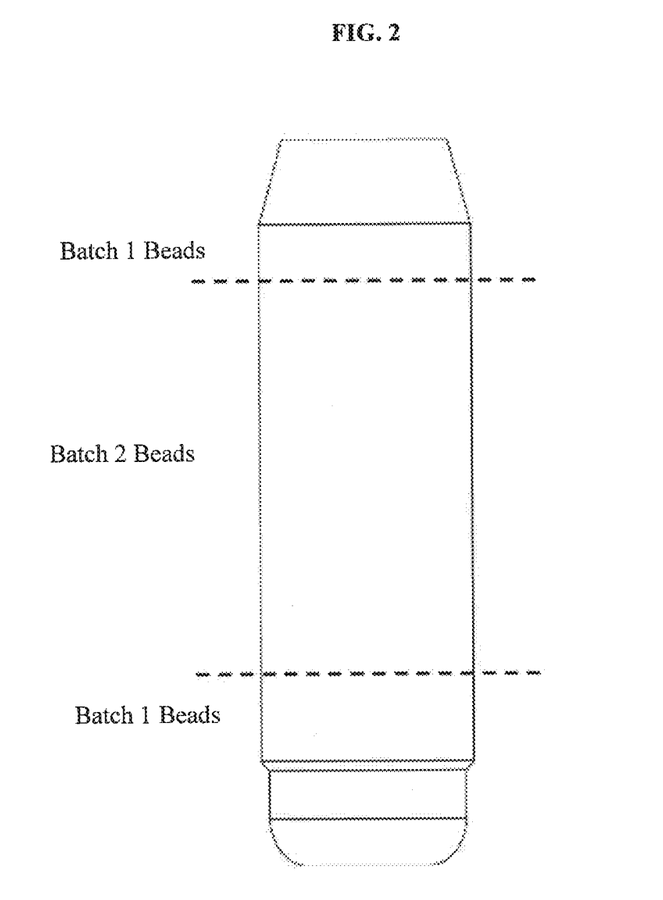
FIG. 2. Is an illustration of cylindrical munition casing having different densities along the wall length.

FIG. 2 is an illustration of the tubular cavity prepared by the process disclosed herein where the foamed celluloid cartridge case is molded using different densities of celluloid beads as the initial feedstock. It is illustrated that the bottom of the ¼ portion or section is comprised of batch #1 beads, the second or middle ½ portion or section is comprised of batch #2 beads and the top, ¼ portion or section is comprised of batch #1 beads.

Figure 3:
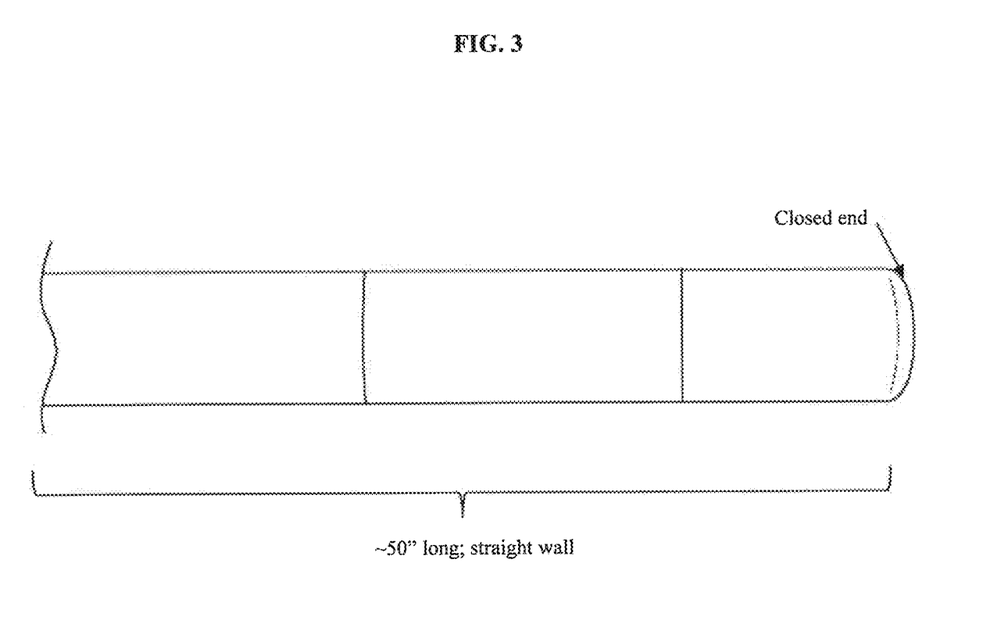
FIG. 3. Is a photograph of straight wall cylindrical munition casing having a closed end or cap on one end.

Alternatively, a hybrid cartridge case can also be molded in a similar fashion to Example 2, where the middle section (½" length) of the cartridge case is fed from a mixture of dry batch #1 beads and batch #2 (or a mixture of ECB-1, ECB-2 & ECB-3 beads from Table 1) to provide a combination of robust and faster burning characteristic. Other metal and non-metal materials can also be used in combination with the celluloid beads to modify the robustness or burn rate of the casing. In preparing foam celluloid munition casing, it is recommended that the casing thickness be equal to and/or greater than 2.5 mm to ensure that the material is robust enough to survive use, loading, transportation, and testing. FIG. 3 is a straight wall (zero degree tapered) munition casing that is ~40" long with a ~6' internal diameter, and with one-end closed or capped. The process described herein can also be applied to make a 155 mm foam celluloid munition casing that is ~50" long, having a ~6" internal diameter, and ~3.3 mm thickness with zero degree taper.

Example 3. Preparation of Foamed Celluloid Having an Insert

Insert material may also be included in the foam celluloid material during the molding process. The insert material may be added to reinforce the strength of the casing thereby providing a consumable product that can withstand transportation and loading pressures.

Figure 4A:
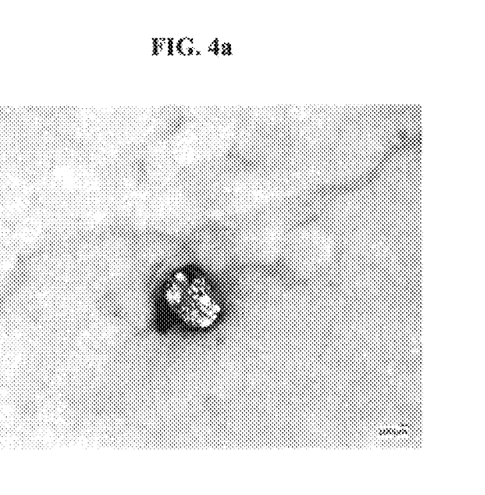
FIG. 4a is an example of a foamed celluloid part having a copper wire insert.
Figure 4B:
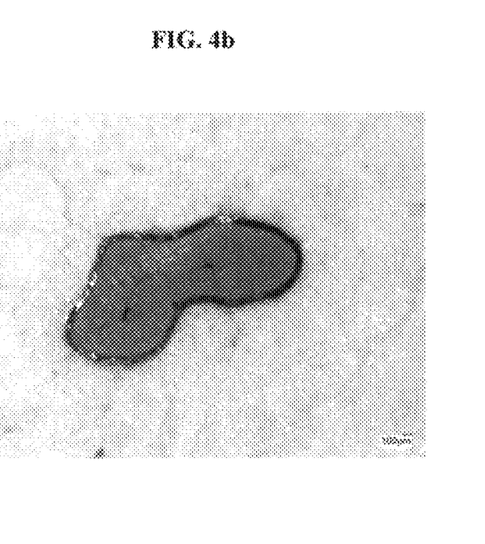
FIG. 4b is an example of a foamed celluloid part with a plastic wire insert.

A compression disc mold was setup on a hydraulic press machine and connected to a heating unit (for this example, steam media was used). Dry solid ECB-3 beads from Table 1 were pre-soaked in a pressurized vessel with 500 psi $CO_2$ (blowing agent) for 3.5 hours. About 3.1 g of ECB-3 beads were weighed and placed into the cylindrical mold, then a 2 mm copper wire and plastic wire skin was inserted into the middle of the mold. The mold was closed and about 5000 lbs of pressure was applied on the hydraulic press machine. The steam valve was opened to 23 psi to heat up the mold and held until the celluloid particles expand and fuse together. The time used here is approximately 90 seconds, however this can be adjusted depending on when the celluloid particles expand and fuse together. The steam valve was closed and the mold was cooled using water and air flow to reduce the temperature. The sample was removed from the mold. FIG. 4a is an example of a foamed celluloid part having a copper wire insert. FIG. 4b is an example of a foamed celluloid with a plastic wire insert.

Various types of materials can be inserted into the mold. Exemplary materials include metal or non-metal materials. Such materials may provide structural improvement, Insensitive Munition response improvement, Electromagnetic Interference (EMI) shielding, or confer anti-static properties to the foamed celluloid structure. Other materials such as electronics, may also be embedded into the foamed celluloid structure so long as such material are compatible within the operating pressures and temperatures used in preparing the foam celluloid part.

Example 4. Preparation of Foamed Celluloid Having Sensors

In addition, MEMS (Microelectromechanical Systems), RFID (Radio Frequency Identification), infrared or optical sensors may be embedded within the celluloid material. Insertion of these types of sensors can aid in identifying the origin/type of munition. For instance, sensors may be embedded into the foam celluloid for logistical purposes to track the munition part. Sensors may also be embedded to provide temperature, migration of components inside the munition, and sensitivity type information that is useful to determine the target and range of accuracy. Depending on the requirements, the sensors can also be embedded in such a manner as to avoid visual detection. Insertion of the sensors into the foam celluloid casing can also save on production costs and extra processing steps when it is incorporated during production of the celluloid casing.

A core-shell mold creating tubular cavity with one closed end can be setup on a hydraulic press machine. Such molding apparatus may be connected to a thermal management unit (for this example, steam or super-heated water media can be used). Dry ECB-3 beads from Table 1 can be pre-soaked in a pressurized vessel at 400 psi $CO_2$ for 2 hours. A miniaturized RFID and a MEMS, infrared temperature sensor can be placed and secured in pre-determined locations within the mold. About 300 g of pre-soaked ECB-3 beads can be pre-weighed and fed into the mold. The mold may be closed and securely held in the hydraulic press machine. The thermal management unit supplies heat to the mold using steam press at 23 psi. Once the temperature stabilizes, the mold can be held until the celluloid particles expand and fuse together, or for approximately 90 seconds. The molding cycle is completed by cooling the mold by water and air to a predetermined temperature. The sample shell containing the molded-in RFID and/or MEMS sensors is removed from the mold before the next molding cycle starts.

Example #1 and 2 describes the process to obtain multi-layered, varying density foamed celluloid product. A similar geometric molding apparatus may be used to mold-in a RFID and/or MEMS sensor into the final product. Exemplary MEMS sensor includes touch sensors, pressure sensor, accelerometer, gyroscopes, linear position sensors, level sensors, flow sensors, gas sensors, temperature sensors, shock sensors, tilt sensors, inclinometers, humidity sensors, inertial sensors, sound sensors, and humidity sensors.

Dry ECB-1, ECB-2, and ECB-3 beads from Table 1 are to be pre-soaked in a pressurized vessel at 400 psi $CO_2$ for 2 hours. A miniaturized RFID and a MEMS, infrared temperature sensor can be placed and secured in pre-determined locations within the mold. About 100 g of each pre-soaked ECB-1, ECB-2, and ECB-3 beads can be pre-weighed and fed into the mold. The mold may be closed and securely held in the hydraulic press machine. The thermal management unit supplies heat to the mold using steam press at 23 psi. Once the temperature stabilizes, the mold can be held until the celluloid particles expand and fuse together, or for approximately 90 seconds. The molding cycle is completed by cooling the mold by water and air to a predetermined temperature. The sample shell of multi-layered varying density with molded RFID and/or MEMS sensors product is removed from the mold before the next molding cycle starts.

The molded products described herein can be further machined into a final, desired shape or configuration. For example a solid cylinder with an outer diameter of 6 inches and about 6 inch in length can be machined into a tube by placing a hole where the inner diameter of the tube ranges from a minimum of fraction of an inch to about 5.8 inches along the longitudinal the length of the molded product. In another example, the combustible material can be molded into a product of "step, L-shaped" geometry using processes described earl. The part is thicker in certain areas and is required to remove excess material which can be machined at about a fraction of an inch (0.07") in thickness and about 0.25 inch in length to achieve an optimum geometrical dimensions of a combustible product.

The foregoing description of the preferred embodiment of the present invention has been presented for the purpose of illustration and description. It is not intended to be exhaustive or to limit the invention to the precise form disclosed, Many modifications and variations are possible in light of the above teachings. It is intended that the scope of the present invention not be limited by this detailed description but by the claims and any equivalents.

What is claimed is:

1. A method for making a foam celluloid munition part containing an embedded insert comprised of:
    exposing dry solid celluloid particles to a physical blowing agent at a pressure of 40 psi to about 10,000 psi to pre-soak the dry celluloid particles;
    transferring the pre-soaked celluloid particles into a munition part mold;
    placing an insert into the munition part mold containing pre-soaked the celluloid particles;
    exposing the munition part mold containing the pre-soaked celluloid particles and an insert to an elevated temperature and pressure, wherein the celluloid particles expand and fuse around the insert thereby embedding the insert and forming the foam celluloid munition part;
    removing the foam celluloid munition part containing the embedded insert from the munition part mold.

2. The process of claim 1, wherein the insert is a metal or plastic material.

3. The process of claim 1, wherein the insert is a sensor selected from the group consisting of MEM devices, RFID tags, infrared and optical sensors.

4. The process of claim 1, wherein the munition part has an aspect ratio of length to diameter that is greater than 6.

5. The process of claim 1, wherein one end of the munition part is closed.

6. The process of claim 5, wherein the munition part is untapered.

7. The process of claim 1, wherein the physical blowing agent is selected from the group consisting essentially of nitrogen, carbon dioxide and argon.

8. The process of claim 1, wherein the dry solid celluloid particles are comprised of 50% to about 85% nitrocellulose, having a nitrogen content of about 10.0% to about 13.6% and about 15% to about 50% camphor.

9. The process of claim 1, wherein the pre-soaked particles are pre-expanded before being transferred into the munition part mold.

10. A method for making a foam celluloid munition part having different densities, comprising the steps of:
    exposing at least two groups of different sized solid celluloid particles to a physical blowing agent at pressure of 40 psi to about 10,000 psi to pre-soak the celluloid particles;
    transferring the pre-soak celluloid particles into a munition part mold wherein the at least two groups of different sized celluloid particles are arranged in a predetermined order;
    exposing the munition part mold containing the at least two groups of pre-soaked celluloid particles arranged in a predetermine order to an elevated temperature and pressure, wherein the least two groups of different sized solid pre-soaked celluloid particles expand and fuse together to assume an interior configuration of the munition part mold thereby forming the foam celluloid munition part;
    removing the foam celluloid munition part from the munition part mold.

11. The method of claim 10, wherein the solid celluloid particles are comprised of 50% to about 85% nitrocellulose, having a nitrogen content of about 10.0% to about 13.6% and about 15% to about 50% camphor.

12. The method of claim 10, wherein the physical blowing agent is selected from the group consisting essentially of nitrogen, carbon dioxide and argon.

13. The method of claim 10, wherein a first group of celluloid particles is a different size than a second group of celluloid particles.

14. The method of claim 10, wherein a first group of celluloid particles is greater in density than a second group of celluloid particles.

15. The method of claim 10, further comprising the step of placing an insert into the munition part mold prior to heating the munition part mold.

16. The method of claim 10, wherein the insert is a sensor.

* * * * *